US012734021B2

(12) United States Patent
Jung et al.

(10) Patent No.: US 12,734,021 B2
(45) Date of Patent: Sep. 15, 2026

(54) CERTIFICATE SYSTEM FOR TRACKING DENTAL MATERIAL AS IT BECOMES A PROSTHETIC

(71) Applicant: B & D Dental Corporation, West Valley City, UT (US)

(72) Inventors: Benjamin Jung, West Valley City, UT (US); Daniel Yonil Jung, West Valley City, UT (US)

( * ) Notice: Subject to any disclaimer, the term of this patent is extended or adjusted under 35 U.S.C. 154(b) by 478 days.

(21) Appl. No.: 18/328,081

(22) Filed: Jun. 2, 2023

(65) Prior Publication Data

US 2023/0390034 A1 Dec. 7, 2023

Related U.S. Application Data

(60) Provisional application No. 63/348,724, filed on Jun. 3, 2022.

(51) Int. Cl.
*A61C 13/00* (2006.01)
*A61C 13/34* (2006.01)

(52) U.S. Cl.
CPC .......... *A61C 13/0006* (2013.01); *A61C 13/34* (2013.01)

(58) Field of Classification Search
CPC . A61C 13/0006; A61C 13/34; A61C 13/0022; A61C 13/0004

(Continued)

(56) References Cited

U.S. PATENT DOCUMENTS 10,517,700 B2 12/2019 Mozo Grau
2011/0008751 A1* 1/2011 Pettersson ................ A61C 5/77 433/167

(Continued)

FOREIGN PATENT DOCUMENTS

CN 112807110 5/2021
JP 2018111008 7/2018
KR 1020210025411 3/2021

OTHER PUBLICATIONS

Calignano, Flaviana et al. Overview on Additive Manufacturing Technologies. Proceedings of IEEE vol. 105, Issue 4, 2017. (Year: 2017).*

(Continued)

*Primary Examiner* — Fawaad Haider

(74) *Attorney, Agent, or Firm* — Thorpe North & Western, LLP

(57) ABSTRACT

A technology is described for a certification system for tracking bulk dental material as it becomes a dental restoration. The bulk dental material, such as yttria stabilized zirconia, is used to form multiple different dental restorations. A trackable code is associated with and carried with the bulk dental material. The trackable code is associated with bulk information of the bulk dental material, such as yttria content and source of origin. A plurality of certificates is associated with and carried with the bulk dental material. Each certificate has a different distinguishable code associable with restoration information of a different one of the multiple different dental restorations. Each certificate is separable from the bulk dental material and associable with a different one of the multiple different dental restorations. Each certificate can be a single monolithic certificate with a partition separable into two parts including a dentist part and a patient part.

5 Claims, 8 Drawing Sheets

(58) Field of Classification Search
USPC ........................................................... 705/28
See application file for complete search history.

(56) References Cited

U.S. PATENT DOCUMENTS

| | | | | |
|---|---|---|---|---|
| 2014/0095200 | A1 | 4/2014 | Bostock | |
| 2016/0089220 | A1* | 3/2016 | Ebert | A61C 13/0019 700/98 |
| 2017/0020638 | A1* | 1/2017 | Stine | A61C 13/0006 |
| 2017/0035537 | A1* | 2/2017 | Leeson | C04B 35/64 |
| 2017/0056138 | A1* | 3/2017 | Zandinejad | A61K 6/15 |
| 2017/0209244 | A1* | 7/2017 | Mayr | A61C 13/082 |
| 2020/0261196 | A1* | 8/2020 | Ruppert | A61C 13/14 |
| 2021/0353154 | A1* | 11/2021 | Saphier | A61C 9/006 |
| 2021/0386528 | A1* | 12/2021 | Hansen | A61C 5/35 |
| 2022/0047402 | A1 | 2/2022 | Casey et al. | |

OTHER PUBLICATIONS

DPid Dental Prosthetic Identification Applications, https://www.denture-id.com/Applications, accessed by at least May 9, 2022.

Kring, What's in Your Mouth?, National Association of Dental Laboratories, https://dentallabs.org/identalloyidentceram-certificate-program-explained/, accessed by at least May 9, 2022.

Decentralized Device Identity at Scale, Wipro Tech Blogs, Medium, https://wiprotechblogs.medium.com/decentralized-device-identity-at-scale-fe9b62cadcc8, accessed by at least May 9, 2022.

GMO Internet Group, GMO Internet Launches GMO Blockchain Open Source Software Project, Offering Medical Record Sharing System as The First Initiative, https://www.gmo.jp/en/news/article/739/, Jul. 20, 2017, accessed by at least May 9, 2022. 7 pages.

GMO Internet Group, Internet for Everyone, Automated, Scalable PKI Management Made Easy, https://www.gmo.jp/en/, accessed by at least May 9, 2022.

Identalloy & Identceram Certificates, Document Your Commitment to Quality, https://identalloy.org/, accessed Sep. 26, 2023.

The IdentAlloy and IdentCeram Certificate Program. The Materials We Verify, https://web.archive.org/web/20220209190816/https://identalloy.org/labs-and-dentists/verify/, accessed Feb. 9, 2022.

* cited by examiner

CERTIFICATE SYSTEM FOR TRACKING DENTAL MATERIAL AS IT BECOMES A PROSTHETIC

PRIORITY CLAIM

Priority is claimed to U.S. Provisional Patent Application No. 63/348,724, filed Jun. 3, 2022, which is hereby incorporated herein by reference.

BACKGROUND

Currently, there is no system to track an individual dental restoration that enables one to look for the lot number and/or serial number of the material from which the restoration was made. If a dental restoration has an issue and a prescribing dentist or manufacturer of the material wanted to know the lot number, batch number, serial number, or reference number, it may be difficult or impossible to identify the problematic lot, batch, or production date by the time the restoration is implanted in a patient's mouth, let alone during the life of the restoration.

DETAILED DESCRIPTION

Figure 1:
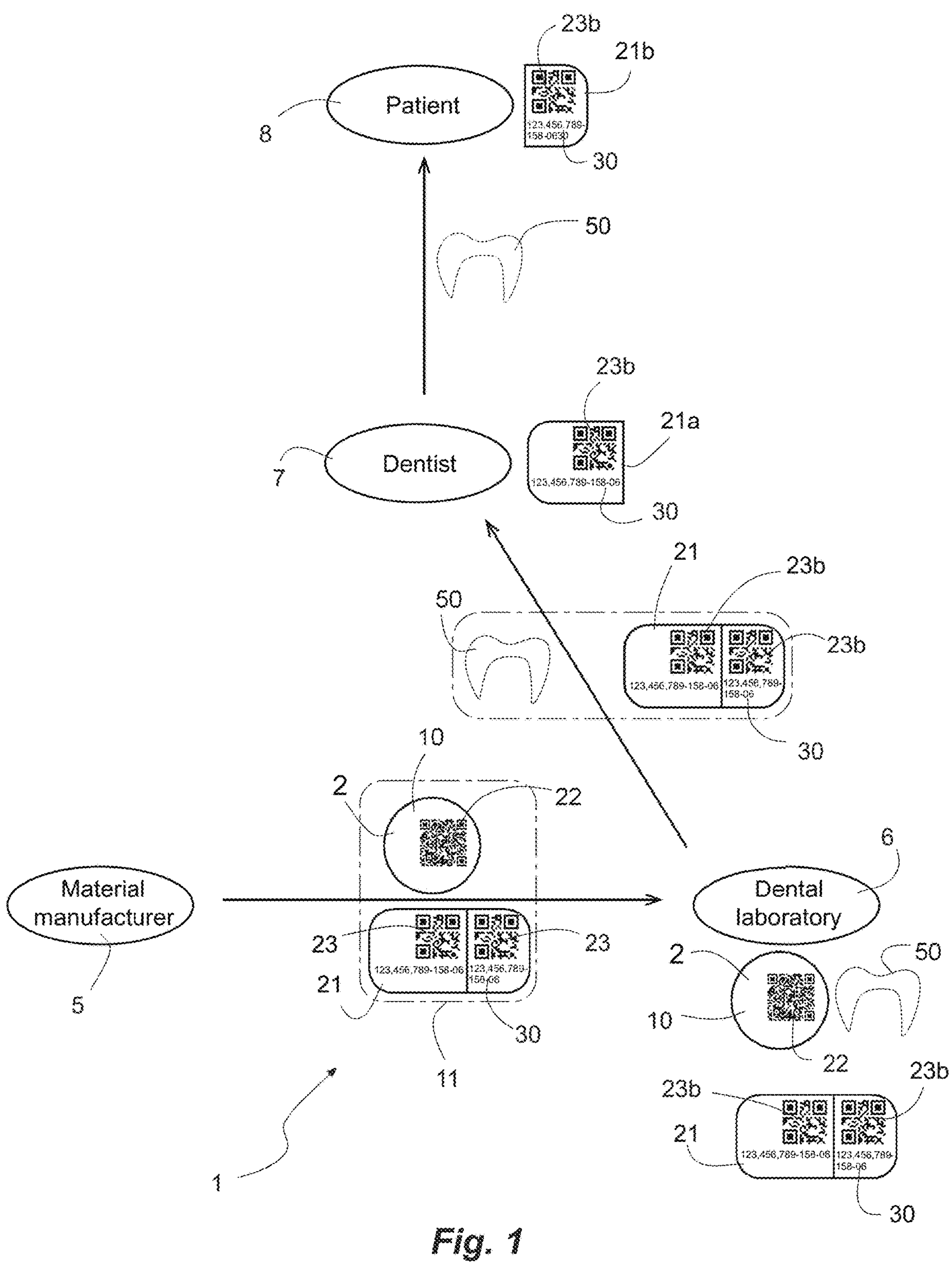
FIG. 1 is a diagram illustrating an example of a certification system for tracking bulk dental material as the bulk dental material becomes a dental prosthetic or restoration.

Before invention embodiments are disclosed and described, it is to be understood that no limitation to the particular structures, process steps, or materials disclosed herein is intended, but also includes equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence. Unless defined otherwise, all technical and scientific terms used herein have the same meaning as commonly understood by one of ordinary skill in the art to which this disclosure belongs.

As used in this specification and the appended claims, the singular forms "a," "an" and "the" include plural referents unless the context clearly dictates otherwise. Thus, for example, reference to "a layer" includes a plurality of such layers.

In this disclosure, "comprises," "comprising," "containing" and "having" and the like can have the meaning ascribed to them in U.S. Patent law and can mean "includes," "including," and the like, and are generally interpreted to be open ended terms. The terms "consisting of" or "consists of" are closed terms, and include only the components, structures, steps, or the like specifically listed in conjunction with such terms, as well as that which is in accordance with U.S. Patent law. "Consisting essentially of" or "consists essentially of" have the meaning generally ascribed to them by U.S. Patent law. In particular, such terms are generally closed terms, with the exception of allowing inclusion of additional items, materials, components, steps, or elements, that do not materially affect the basic and novel characteristics or function of the item(s) used in connection therewith. For example, trace elements present in a composition, but not affecting the composition's nature or characteristics would be permissible if present under the "consisting essentially of" language, even though not expressly recited in a list of items following such terminology. When using an open ended term in the specification, like "comprising" or "including," it is understood that direct support should be afforded also to "consisting essentially of" language as well as "consisting of" language as if stated explicitly and vice versa.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments described herein are, for example, capable of operation in other orientations than those illustrated or otherwise described herein.

The term "coupled," as used herein, is defined as directly or indirectly connected in an electrical or nonelectrical manner. Objects described herein as being "adjacent to" each other may be in physical contact with each other, in close proximity to each other, or in the same general region or area as each other, as appropriate for the context in which the phrase is used. Occurrences of the phrase "in one embodiment," or "in one aspect," herein do not necessarily all refer to the same embodiment or aspect.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result. For example, a composition that is "substantially free of" particles would either completely lack particles, or so nearly completely lack particles that the effect would be the same as if it completely lacked particles. In other words, a composition that is "substantially free of" an ingredient or element may still actually contain such item as long as there is no measurable effect thereof.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

As used herein, the term "about" is used to provide flexibility to a numerical range endpoint by providing that a given value may be "a little above" or "a little below" the endpoint. It is understood that express support is intended for exact numerical values in this specification, even when the term "about" is used in connection therewith.

As used herein, the term "zirconia" refers to various stoichiometries for zirconium oxides, most typically $ZrO_2$, and may also be known as zirconium oxide or zirconium dioxide. The zirconia may contain up to 20 weight percent of oxides of other chemical elements such as, for example, oxides of yttrium (e.g., $Y_2O_3$), ceria, or ytterbium, etc. The zirconia can be: 1) solid form (disc, block or blank generally called a green body) for milling, or 2) liquid (slurry or paste type) form for 3D printing, for example, paste type mixed with zirconia powder and binder, or 3) zirconia resin.

The terms "prosthetic" and "restoration" are used interchangeably herein. The restoration can be a crown or bridge. Unless otherwise specified, the terms "block" and "disc" are used interchangeably herein to refer to a dental material in block or disc form and from which the dental restoration is formed. The dental blocks can be rectilinear while the discs can be cylindrical. As used herein, the term "zirconia restoration" refers to a zirconia prosthetic made from zirconia.

As used herein, the term "number" can be and can include numbers, alphabetic characters, special characters, alpha-numeric information, or any combination of these. For example, the word "number" in "tracking number", "certificate number" or "serial number" means tracking or serial information made of numbers, alphabetical information, special characters, alpha-numeric information, or any combination of these.

Reference will now be made to the examples illustrated in the drawings, and specific language will be used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

This invention presents a certification system for tracking a bulk dental material as it becomes a dental prosthetic or restoration. The certification system can allow a dental laboratory, a dentist and/or a patient to make an informed consent about the dental material, such as dental material composition and geographic source of manufacture of the dental material. In addition, the certification system can allow a dentist to disclose information on dental material with trust and confidence. Furthermore, the system can provide a dental restoration with an individual tracking number allocated to the restoration. The tracking number can be associated with information unique to the production of the dental material and/or the dental laboratory's fabrication of the restoration. This information can allow for the informed consent from the patient before choosing a restoration or material type. The information can include manufacturing data and physical properties of the dental material and/or the restoration from the material.

The bulk dental material can be used to subsequently originate or produce multiple different dental restorations. The bulk dental material can be yttria stabilized zirconia. A trackable code can be associated with and carried with the bulk dental material. The trackable code can be associated with bulk information of the bulk dental material, such as yttria content and geographic source. A plurality of certificates can be associated with and carried with the bulk dental material. Each certificate can have a different distinguishable code associable with restoration information of a different one of the multiple different dental restorations. Each certificate can be separable from the bulk dental material and associable with a different one of the multiple different dental restorations. In one aspect, each certificate can be a single monolithic certificate with a partition separable into two parts including: 1) a dentist part distributable to a dentist, and 2) a patient part distributable to a patient. Each part can have the trackable code and the distinguishable code.

FIG. 1 illustrates an example of the certification system 1 for tracking a bulk dental material 2 as it becomes a dental prosthetic or restoration 50. In one aspect, the system 1 can apply to dental material 2 not used for temporary applications, i.e. dental material 2 used for permanent dental restorations. The dental material 2 and the dental prosthetic or restoration 50 can be visible and cosmetic. The dental material 2 can be and can include zirconia as described herein. Thus, the dental material 2 can be provided as zirconia dental blocks or discs 10. In another aspect, the dental material 2 can be resin. The dental material 2 can be produced or formed by a material manufacturer 5 and provided in the dental blocks or discs 10. The dental prosthetics or restorations 50 can be crowns and bridges. In another aspect, the dental prosthetic or restoration 50 can be dentures. The dental restorations 50 can be produced or formed by a dental laboratory 6. The dental laboratory 6 can receive the dental discs 10 from the material manufacturer 5. The dental laboratory 6 can design the dental restoration 50, mill the dental restoration 50 from the dental discs 10, and sinter the dental restoration 50. The dental restorations 50 can be implanted in a patient's mouth by a dentist 7. The dentist 7 can prepare the patient's mouth by shaping a tooth or implanting an implant, and scanning the patient's mouth. The dental laboratory 6 can receive the scan from the dentist 7 and for use in designing the dental restoration 50.

Figure 2:
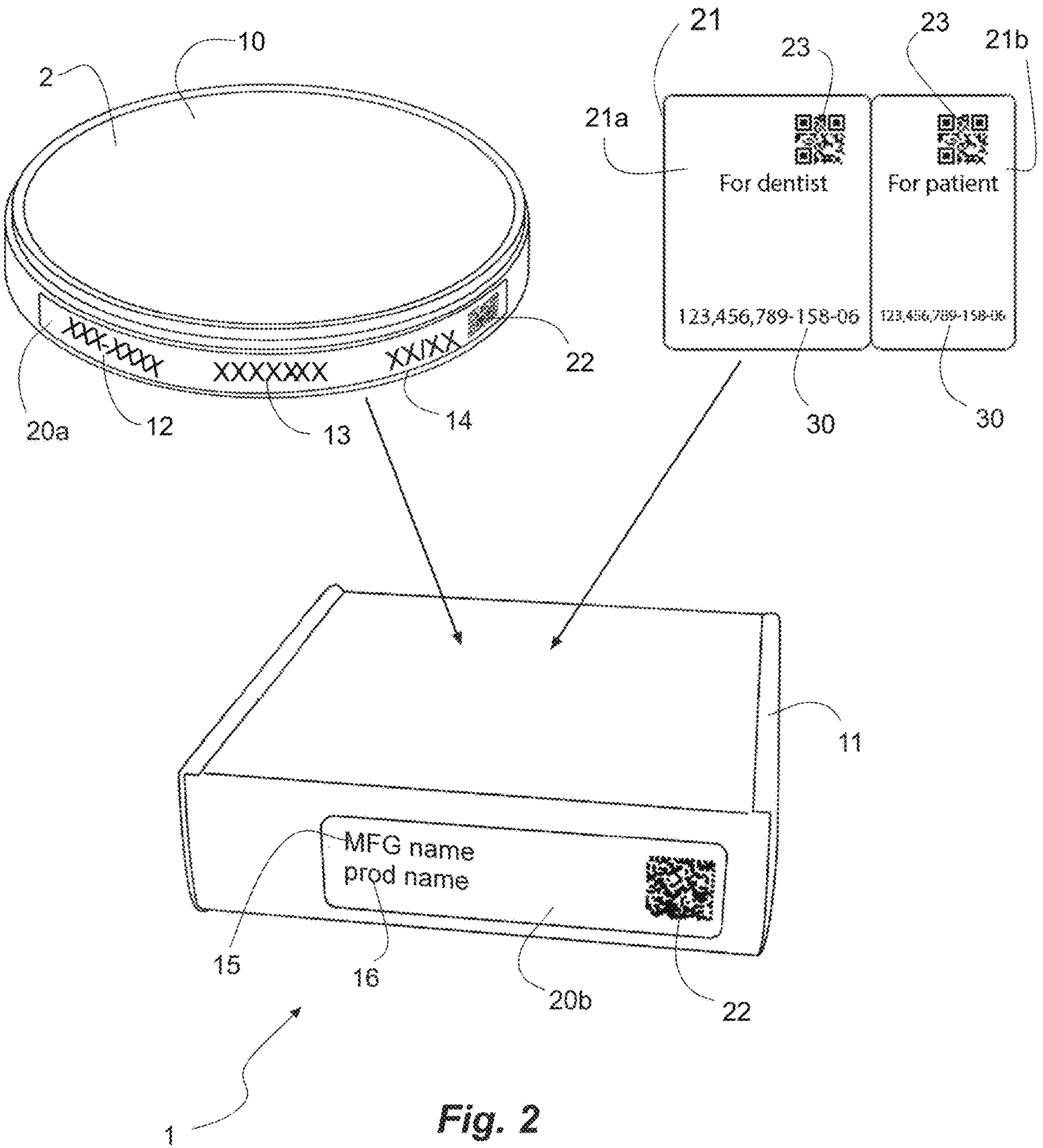
FIG. 2 is a diagram illustrating an example of the certification system.
Figure 5:
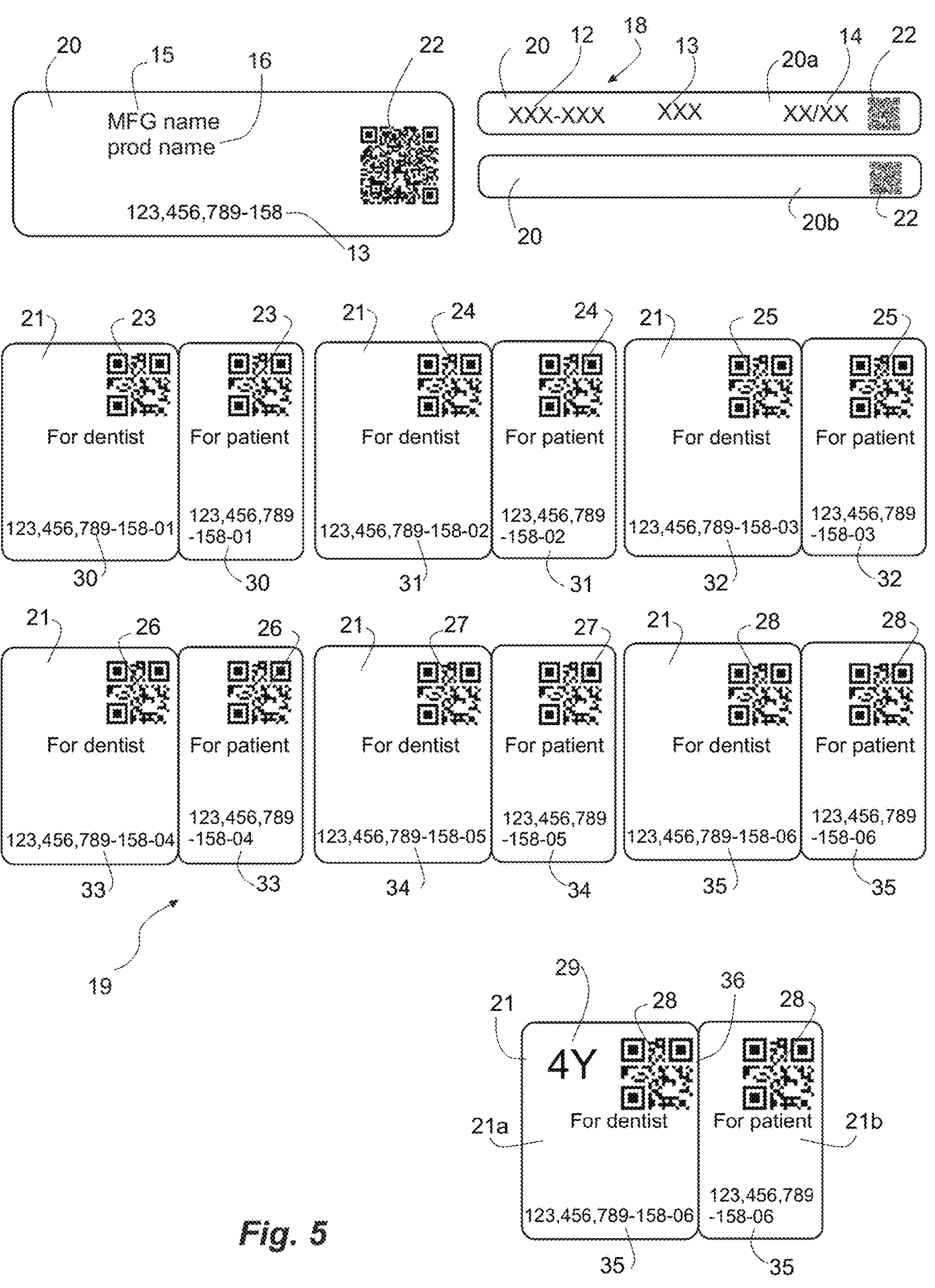
FIG. 5 is a diagram illustrating an example of the certification system.

Zirconia disc, product labels and tracking—Referring to FIGS. 1, 2, and 5, in one aspect, the dental material 2 and the dental discs 10 can be provided with one set 18 (FIG. 5) of at least two product labels 20. In one aspect, the product labels 20 can be produced by the material manufacturer 5. A first product label 20*a* (FIG. 2) can be attached to the dental disc 10, such as on a perimeter or lateral edge. A second product label 20*b* (FIG. 2) can be attached to a packaging box 11 containing the dental disc 10. The label 20 can contain information, such as: a lot number (or a batch number) 12 (FIG. 2): a serial number 13; a production date 14: a size of the disk; a shade of the material; shrinkage data of the material when sintering; a manufacturer name 15: a product name 16; a reference number; a material composition of the dental material 2 and the dental disc 10; and/or a trackable code 22 (e.g. a QR code) that contains or is associated with this information. In one aspect, the trackable code 22 can be indicium or indicia, such as alphanumeric and/or graphic. In another aspect, the trackable code 22 can contain the information encoded therein. In another aspect, the trackable code 22 can be associated with the information through a database. In another aspect, this information, including the trackable code 22, can be printed directly on the dental disc 10, such as around the perimeter or lateral edge. For example, a batch of 1,000 dental discs 10 can be produced with 1,000 different serial numbers 13 so that each dental disc 10 can have a different serial number 13. In one aspect, the product labels 20 can have an adhesive backing to allow the labels 20 to be adhered to the dental disc 10 and the associated packaging box 11. The information can be printed on the labels 20.

In another aspect, each dental disc 10 can have at least one tracking certificate 21 along with the product labels 20. In another aspect, each dental disc 10 can have a plurality of tracking certificates 21. By way of example, about twenty single dental restorations 50 can be made from one dental disc 10. Thus, each dental block or disc 10 and associated product labels 20, can have an additional set 19 (FIG. 5) of tracking certificates 21. For example, twenty tracking certificates 21 can be provided with each dental disc 10. In addition, the tracking certificates 21 can have different, unique restoration serial numbers 30-35 and distinguishable codes 23-28 thereon corresponding to each subsequent, unique dental restoration 50 produced from the dental disc 10. In another aspect, the restoration serial numbers 30-35 can be successive. In another aspect, the restoration serial numbers 30 can derive from the serial number 13 of the dental block or disc 10 to be a unique restoration serial number 30 for the corresponding dental restorations 50. This unique restoration serial number 30 can be used to identify the unique dental restoration 50 and for tracking the unique dental restoration 50. In another aspect, all the distinguishable codes 23-28 can be unique and used for tracking. In one aspect, under one distinguishable code 23 for the dental disc 10, there can be as many as 10, 20, 30, or even more, restoration trackable codes 23-28. For example, the set 19 of twenty tracking certificates 21 can be provided for each dental disc 10. By way of example, a batch of 1,000 zirconia dental discs 10 can be produced and provided with 20,000 tracking certificates 21 for tracking restorations 50. The restoration serial number 30 can derive from either the serial number 13, the batch number 12, the lot number, or any combination of these numbers.

Figure 3:
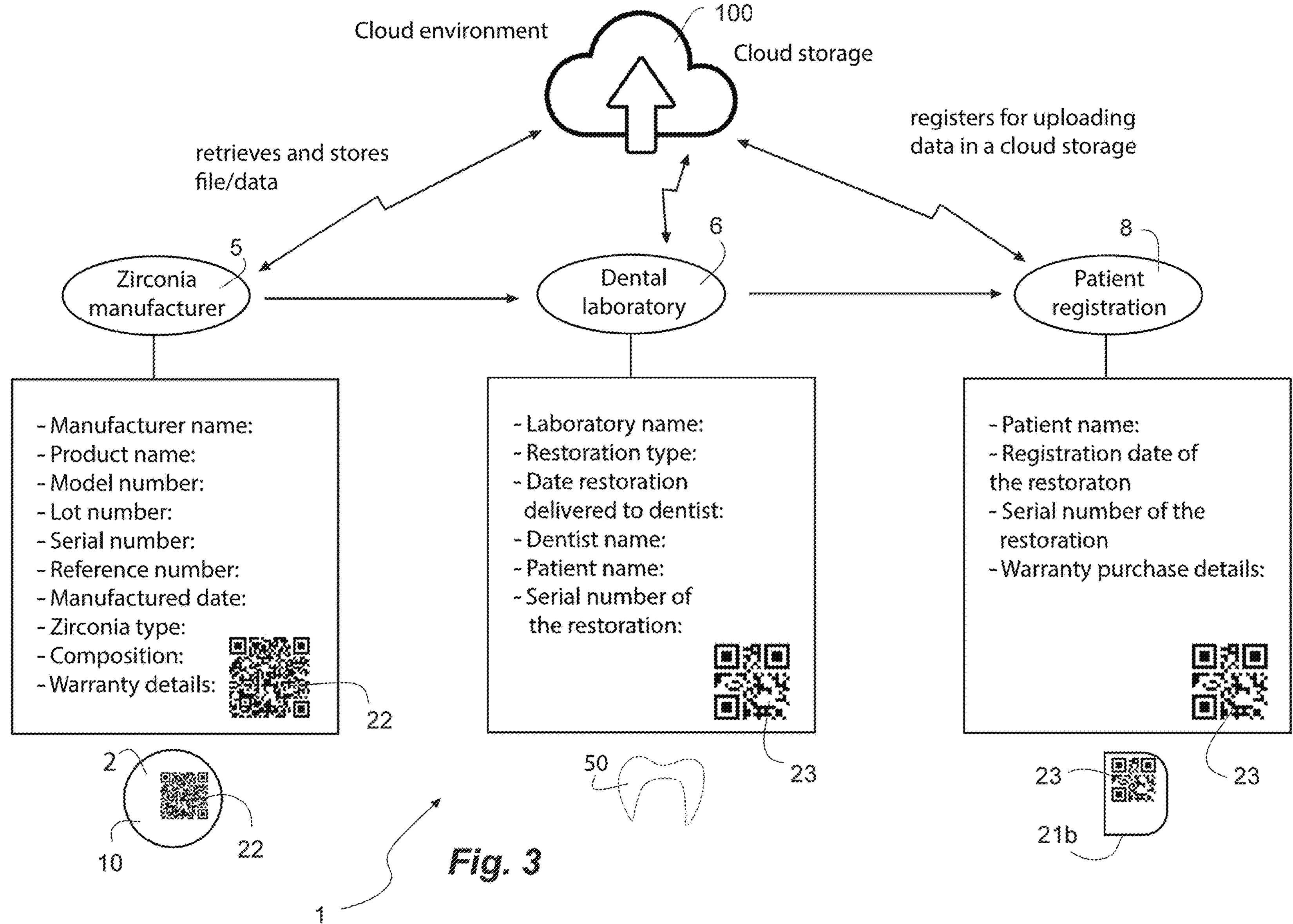
FIG. 3 is a diagram illustrating an example of the certification system.

Zirconia manufacturer information and Laboratory information—As illustrated in FIG. 3, the information regarding the bulk dental material 2, such as the zirconia disc 10, a blank or a slurry, that may be considered by the manufacturer 5, the dentist 7 and the patient 8, can include: the manufacturer name, a product name, a model number, country or geographic source of origin of the zirconia, physical properties of the dental material 2 and/or zirconia (such as strength, translucency, and composition of the material 2), a batch number 12, a serial number 13, a reference number, a production or manufactured date, a size of the block or disc 10, a shade of the dental material 10, shrinkage data of the dental material 2 upon sintering, and/or the manufacturer's warranty details. At least some of this information can be incorporated into the distinguishable codes 23-28 under the present system 1 for full disclosure to patients 8. After the dental laboratory 6 finishes fabricating the restoration 50 from the dental disc 10, the lab information can also be added along with the information about the bulk dental material 2 and manufacturer. In one aspect, the information can be input into an online server or cloud storage 100 (FIG. 3). In another aspect, the online server or cloud storage 100 can also manage the certificates 21 and distinguishable codes 23-28. Lab information can include information such as: a dental laboratory name, a restoration type, a date restoration was delivered to dentist, a prescribing dentist's name, and the serial number 23 of the restoration 50. In another aspect, this information can be provided as a disclosure to the patient 8. After the lab information is incorporated into the restoration distinguishable code **23*b* provided by the material manufacturer 5, this certificate 21*b* can become the one with the trackable code 23*b* with lab data incorporated for the dentist 7 and patient 8** to use.

Distinguishable codes—Distinguishable codes 23-28 of the restorations 50, as well as the trackable code 22 of the dental material 2, can be any type of unique code, such as:

1) a machine-readable code (barcode) in the form of numbers and a pattern of parallel lines of varying widths;
2) a machine-readable quick-response (QR) code in the form of an array of black and white squares;
3) a radio frequency identification (RFID) tag;
4) a machine-readable code (maxicode) in the form of dots arranged in a hexagonal grid;
5) a machine-readable two-dimensional (2D) symbol (Aztec code) in the form of square modules with a unique finder pattern in the middle;
6) a machine-readable two-dimensional (2D) code (Data Matrix code) in the form of black and white dots arranged in a square or rectangular pattern;
7) a machine-readable two-dimensional (2D) strip of pixel columns in black/white or color (Ultracode);
8) an alphanumeric number;
9) a near-field communication (NFC) device using short-range (<~4 cm) wireless communication protocol; or
10) a combination of these.

Figure 4:
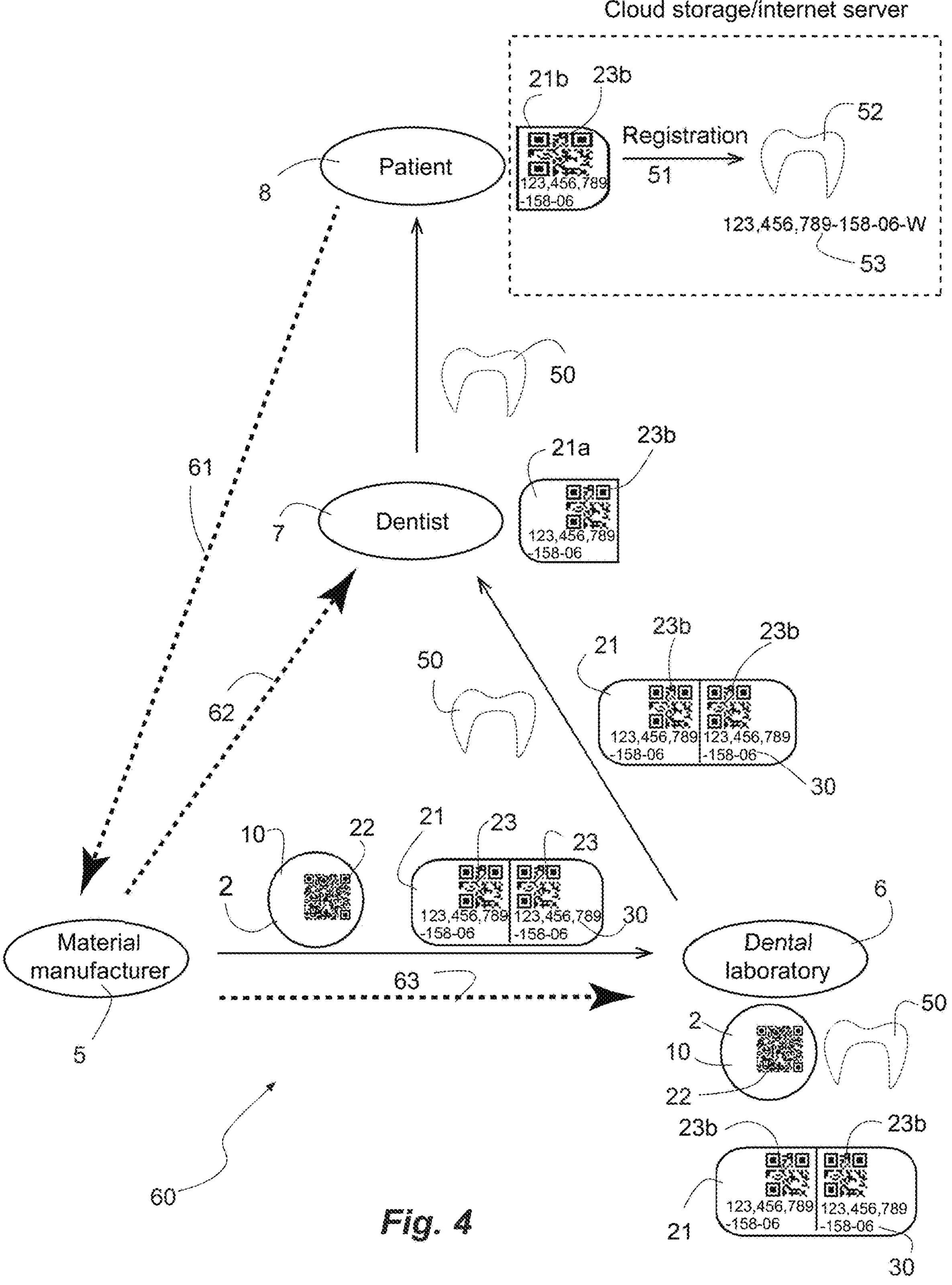
FIG. 4 is a diagram illustrating an example of the certification system and a warranty system.

The trackable codes 22, and the distinguishable codes 23-28, can be used for storing the information discussed herein and can be used by the material manufacturer 5, the dental laboratory 6, the prescribing dentists 7, and the patient 8 to facilitate data retrieval. The information for the dental material 2 and/or the restoration 50 can be retrieved with a mobile device, such as a smartphone or cellular phone, by scanning and reading the trackable code 22 and/or the distinguishable code **23*b*. In another aspect, the restoration serial number 30 can be entered into an internet server/website or an app intended for tracking the restoration 50 and/or a warranty system, as shown in FIG. 4**.

In one aspect, the trackable codes 22, as well as the distinguishable codes 23-28, can contain or encode the information within the trackable code 22 or the distinguishable code 23-28 itself. In another aspect, the trackable code 22 or the distinguishable code 23-28 can contain or encode the restoration serial number 30 that can access the information from a database/cloud storage 100 utilizing an app or computer. In another aspect, the trackable code 22 or the distinguishable code 23-28 can contain or encode the restoration serial number 30 and a web address to a web site that can access the information using the restoration serial number 30.

3Y, 4Y, 5Y and conversion between weight % and mol %-In dentistry, material composition can be described and shown as weight % (wt %). In another aspect, material composition can be described and shown as mol % but can be less common. Conversion between weight % and mole % (mol %) can be performed but may not be readily available. A zirconia classification mark 29 (FIG. 5) can facilitate the dentists' choice of the zirconia restoration type. The classification mark 29 can designate the material composition of the dental material 2, such as the mol % of yttria in the dental material 2. For example, the classification mark 29 of "4Y" can designate 4-mol %-yttria stabilized zirconia; whereas the classification mark of "5Y" can designate 5-mol %-yttria stabilized zirconia. The 4Y zirconia can have a higher flexural strength than 5Y zirconia and can have better crack resistance mechanisms by nature. The classification mark 29 can provide a system to identify the material composition and mol % of zirconia of the bulk dental material 2 readily and quickly. As shown in FIG. 5, the classification mark 29 "4Y" can represent 4Y, 4.0Y, 4.1Y, 4.2Y, 4.3Y, 4.4Y, 4.5Y, 4.6Y, 4.7Y, 4.8Y, or 4.9Y, or any number between 4 and 5 followed by the letter Y. Alternatively, the classification mark 29 can be shown as 4YS, 4.0YS, 4.1YS, 4.2YS, 4.3YS, 4.4YS, 4.5YS, 4.6YS, 4.7YS, 4.8YS, or 4.9YS, or any number between 4 and 5 followed by the letters YS.

Crown fabrication—As shown in FIG. 5, each time a dental restoration 50 is made from the dental disc 10 in a dental laboratory 6, one specific tracking certificate 21 with a unique restoration serial number 30 and a distinguishable code 23 can be allocated to and associated with the restoration 50. The dental restoration 50 and the tracking certificate 21 can be carried together and provided to the dentist 7. Thus, restoration 50 can have a matching and trackable batch number 12, a serial number 13, or a reference number of the associated dental disc 10, and a trackable certificate serial number 30-35 matching the restoration 50. Each restoration 50 from a dental laboratory 6 can have a specific tracking number (serial number 30) allocated to the restoration 50. In one aspect, the certificate serial numbers 30-35 can be the same as the restoration serial numbers 30-35. In another aspect, the restoration serial numbers 30 can be a different alpha-numeric system capable of tracking the restoration 50. For example, a batch of 300 zirconia discs 10 can have a batch number 12, such as "123,456,789", and serial numbers 13, such as from "123,456,789-001" to "123,456,789-300". Furthermore, a zirconia disc 10 can have a serial number 13, such as "123,456,789-001" and can have 20 trackable certificate or restoration serial numbers 30, such as from "123,456,789-001-01" to "123,456,789-001-20". Therefore, a specific dental zirconia restoration 50 can have a trackable certificate or restoration serial number 30 of "123-456-789-001-17". This restoration serial number ("123,456,789-001-17") can be both a certificate number and restoration serial number. In another aspect, the restoration serial number 30 can be different from the tracking certificate numbers. For example, a dentist 6 can seat six anterior single crowns (tooth number 6, 7, 8, 9, 10, and 11) in a single day for the same patient 8, the tracking certificate number could be "123,456,789-001-17" and the restoration serial number for each restoration could be "123,456,789-001-17-6"; "123,456,789-001-17-7"; "123,456,789-001-17-8": "123,456,789-001-17-9"; "123,456,789-001-17-10" and "123,456,789-001-17-11".

Laboratory information—As shown in FIG. 3, the manufacturer 5 or the distributor of the zirconia dental material 2 or the zirconia dental disc 10 can upload the dental laboratory 6 information to the tracking server/cloud 100 storage/app based on a zirconia invoice/order information to initiate laboratory 6 data entry. Thus, the dental laboratories 6 can easily log in to their account to create dentist 7 accounts.

2-part certificate, Patient record—As shown in FIG. 5, each certificate 21 can be a single, unitary and monolithic certificate separable into first and second parts. A first dentist part 21*a* of the tracking certificate 21 can be physically fixed in the patient's dental record for disclosure to the prescribing dentist 7. The tracking certificate number or the restoration serial number 30-35 can also be entered into the patient's digital record. A second patient part 21*b* of the tracking certificate 21 can be given to the patient 8 for personal records, patient disclosure, and/or registration, such as for extended warranty purposes. In one aspect, the parts 21*a* and 21*b* of the certificate 21 can be paired together. In another aspect, the certificate 21 can be a single monolithic sheet or piece that has a partition 36, e.g. a serration or a score, which is breakable and separable along the partition 36 to bifurcate the sheet or piece of the certificate 21 into two parts 21*a* and 21*b*. In another aspect, the certificate 21 can be a sticker with an adhesive backing covered by a removable backing layer.

Information disclosure and Blockchain—The information described herein and shown in FIG. 3, can be uploaded to cloud storage 100 from the zirconia manufacture 5, the dental laboratory 6, the dentist 7 and/or the patient 8. In addition, the information can be maintained permanently using blockchain technology. Blockchain is a public ledger verified by the participants to take care of trust issues. Once the information is produced, and stored on the blockchain web, the information is not changeable permanently. For example, the restoration serial number 30, along with the information, can form a transaction that is then represented in a block; with the block send to nodes in a network which validate the transaction; the block is added to an existing blockchain and distributed across the network.

Zirconia breakage, 3Y vs 5Y—The strength of zirconia weakens with the addition of higher yttria contents. For example, 3Y (3 mol %) yttria stabilized zirconia dental material 2 has the highest flexural strength followed by 4Y; while 5Y has the lowest flexural strength. As a result, a zirconia restoration 50 made with 5Y (or 5Y for at least part of the restoration) dental material can break or crack in the patients mouth more often than a restoration 50 made with either 3Y or 4Y. The tracking system 1 described herein can allow the manufacturers 5, the dentists 7 and the patients 8 to easily track the classification of a specific zirconia restoration 50. Specifically, the tracking certificate 21 can visually show the classification 29 of the restoration 50 with for example: 3Y, 3YS, 4Y, 4YS, 5Y, 5YS, 3.5Y, 3.5YS, 4.5Y, 4.5YS, any combination of these, or any combination of alpha-numeric information.

Warranty of the restoration—In another aspect, the certification system 1 for tracking a dental material 2 or dental disc 10 as it becomes a prosthetic 50 can allow a zirconia manufacturer 5 to offer a warranty system 60, as shown in FIG. 4, for the restoration 50 for at least a certain period for the patient 8 and/or the dentist 7 in case the restoration 50 fails in the patient's mouth. Each dental restoration 50 can have a unique trackable restoration serial number 30 (as shown in FIG. 5) or a distinguishable code 23 under the certification system 1 that enables tracking to the responsible manufacturer 5 of the zirconia dental material and/or dental disc 10 and identification of the zirconia type (3Y, 4Y, 5Y, or combination of any of these).

After the restoration 50 is seated inside the patient's mouth, the patient 8 can register 51 the restoration 50 for a warranty program using the patient certificate 21B, distinguishable code 23*b* or restoration serial number 30. An internet server 100 or app can be used by the patient to turn a non-registered restoration 50 into a registered restoration 52 with a confirmation number 53. In one aspect, registering 51 the restoration 52 can include making a payment 61 to the zirconia manufacturer 6 or the dentist 7 for the warranty program. The warranty program can warranty the restoration 52 against possible cracking or breakage of the registered restoration 52 for a predetermined period of time. The manufacturer 6 can reserve the payment and if, or when, there is a claim for a failed restoration in the patient's mouth, can reimburse the expenses 62 to the dentist 7 or patient 8 after confirming the failed restoration using the tracking system 1. In another aspect, a portion of the warranty payment 61 from the patient 8 can be provided as a reward 63 to dental laboratories 6. Similarly, a loyalty program can be implemented between the zirconia manufacturer 5 and the dental lab 6 with the tracking system 1.

Method—One example of the whole process of the system 1 includes a dental laboratory 6 securing a zirconia dental disc 10 made from a dental material 2 from a zirconia manufacturer 5 or distributor along with a tracking certificate 21 that has certificate number or restoration serial number 30; and can also have a trackable distinguishable code 23. Then, the laboratory 6 can provide a zirconia dental restoration 50 from the zirconia dental disc 10 along with the certificate 21 to the dentist 7. The certification system 1 can track the dental material 2 as it becomes a dental restoration 50. Furthermore, after the dentist 7 seats the restoration 50 in the patient's mouth, the patient 8 can register the prosthetic 50 utilizing a patient certificate 21*b* and/or restoration serial number 30 and trackable distinguishable code 23 under the warranty system 60. Furthermore, a patient 8 can make a payment to the dental material manufacturer 5 for possible failure of the material 2 (or alternatively, to the dentist 7). Furthermore, if the prosthetic 50 fails in the patient's mouth, the registered prosthetic 52 can be covered by the material manufacturer 6, or alternatively by the dentist 7.

Figure 6A:
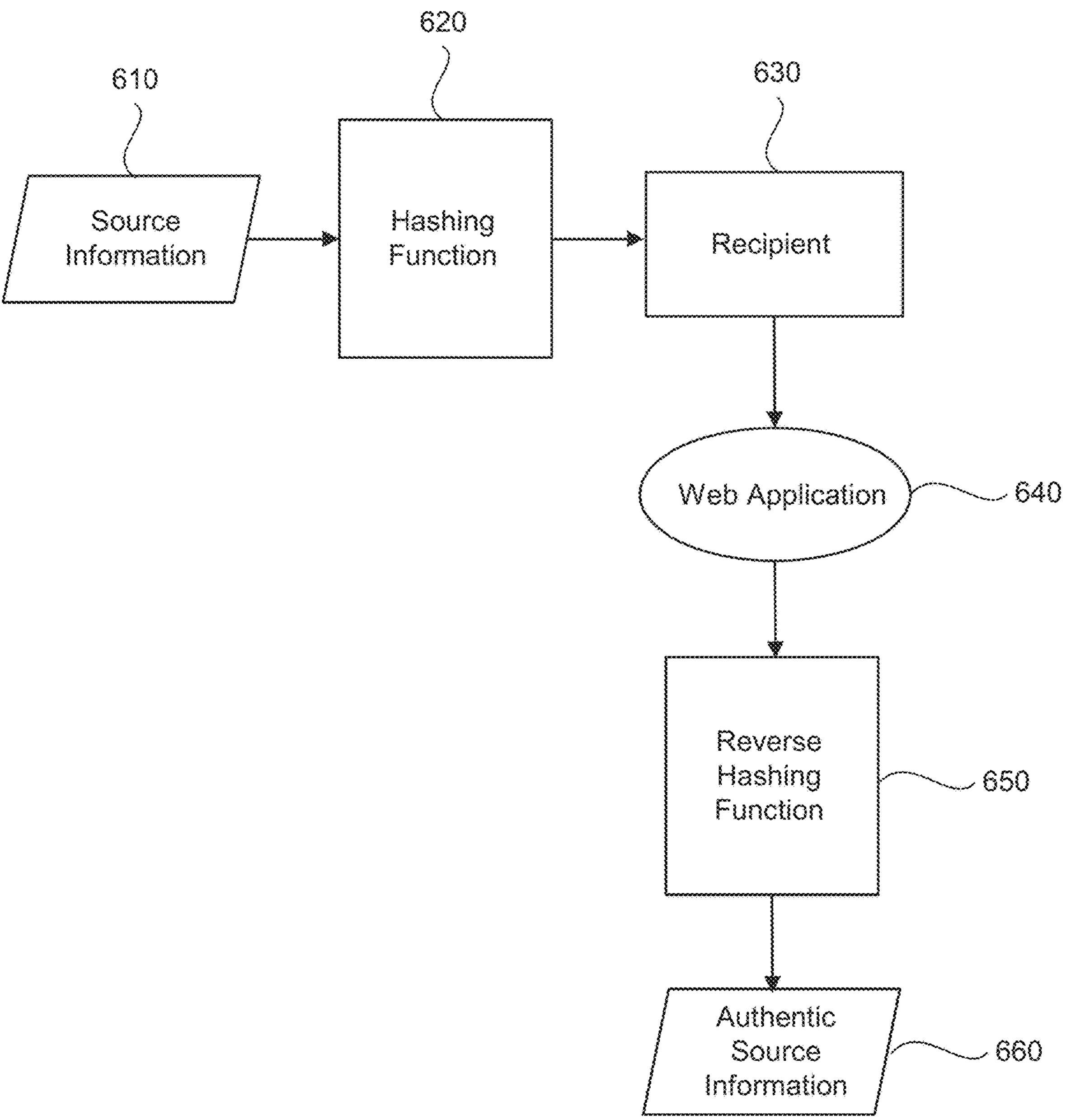
FIG. 6A is a block diagram illustrating source information that is been hashed and then a reverse hashing function is applied.

FIG. 6A is a block diagram illustrating a system for verifying the source and/or manufacturing location of dental material (e.g., a block of dental material) or a dental restoration. In one configuration, source information 610, such as: a reference number, serial number, source value and/or a location value (e.g., location name or GPS value) may be used individually or in combination to verify the source, quality and/or authenticity of dental material or dental restorations. A value or combination of values may be hashed through a reversible hashing function 620 by the source of the dental material or dental restoration. The hashing function may be a custom hash function or a hash function such as an AES (Advanced Encryption Standard), RSA, a cryptographic hashing function or another reversible hashing function. Third parties may have difficulty spoofing the reversible hash function, and so the recipient may know the real sender provided the source data because the output of the reversible hash function provides where the dental material or dental restoration has come from, i.e. the origin of the dental material or dental restoration.

Later, when the recipient 630 of the material, for example, a dentist, a dental lab or a patient receives the output information from the hashing function, the output information may be entered into a web site, web application 640, or a mobile application and the hashing function may be reversed 650 by the source company or another party. The reverse hashing function may provide in the authentic source information 660, including: manufacturing reference number, serial number, source value, location value, or other information being returned from the hashing function.

In a further example, a location value where the dental material or dental block was made (e.g., a GPS location or a name of location), the material type, the manufacturer name, and other origination information may be run through a hash algorithm. Then when the hashed information gets to the destination or buyer, the recipient can run this information backwards through the reverse hash algorithm and the information about the source of the dental material or tooth restoration may be obtained.

Figure 6B:
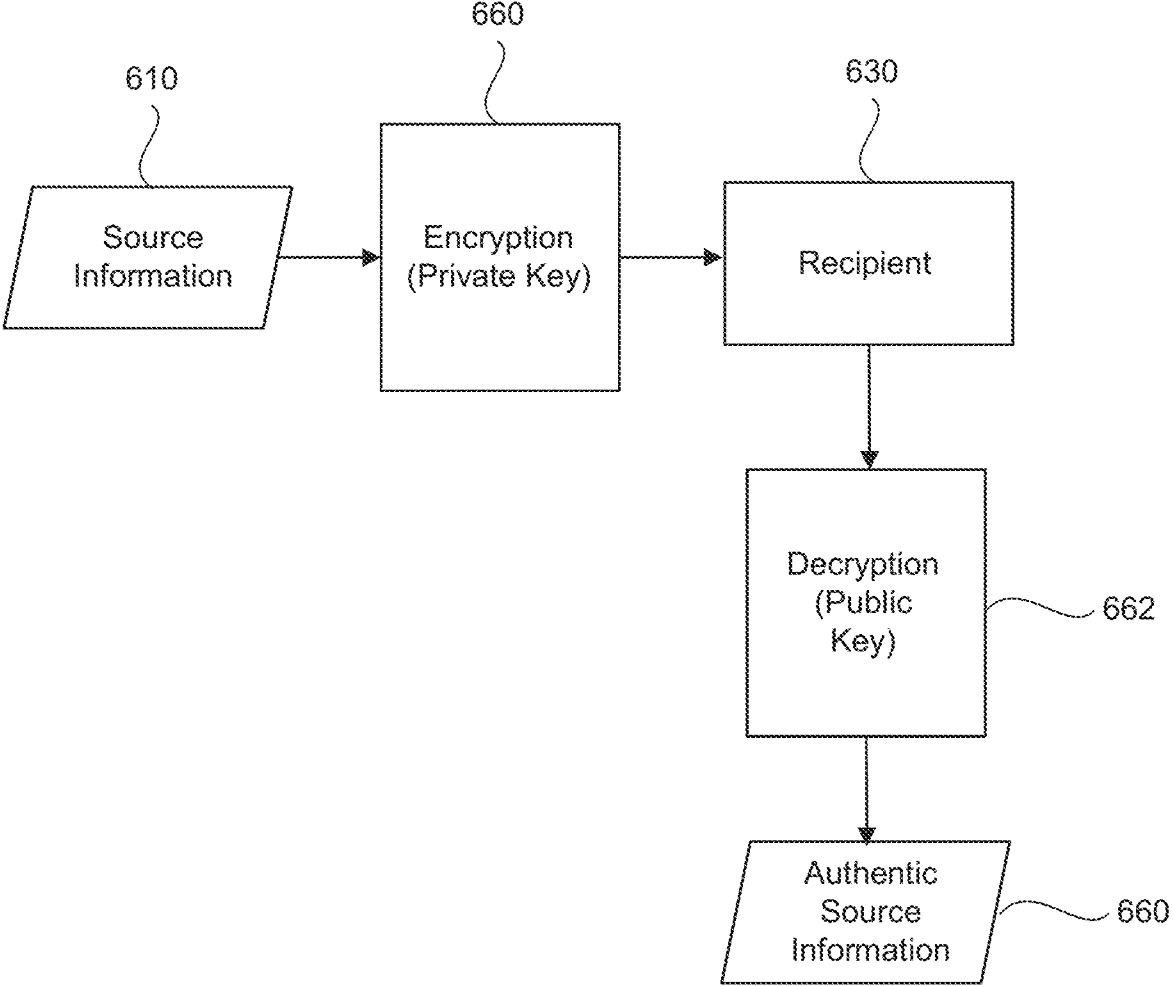
FIG. 6B is a block diagram illustrating the use of private and public encryption keys to protect the authenticity of source information.

In another configuration, FIG. 6B illustrates that any source information 610 maybe be encrypted 660 as individual elements or as a group of information elements before being sent to the recipient 630 with the dental material. The source company who provides the source information 610 may encrypt the source information 610 using their private key. Then the source company may publicly share its public decryption key from their private/public encryption pair. Any recipient of source information from the source company can use the public key to decrypt 662 the information encrypted with the private key to provide the authentic source information 660. The decrypted information can provide any source information contained in the encrypted information. For example, the source information may include: the manufacturing reference number, serial number, source value, location value, a GPS location value, or other information that proves where the dental material or dental restoration was manufactured or sourced from. If an imposter or counterfeiter tries to encrypt this information into any encrypted message, they will not have the source company's private key that matches the public key provided publicly. The encrypted information may be provided to the recipient of the dental material using: a 2D bar code, a flash memory, an email, a text message, an instant message or some other way. Additional information may also be included in the encrypted information package, such as a 3D model of the tooth to help prove the source of the dental material (e.g. a machine-readable code on the dental block). In another example, the 3D model of the tooth can be used to seed the encryption keys or the hash algorithm. Then the recipient must have the dental material or restoration tooth to run the encryption or hash algorithm backwards. This may mean the recipient scans in the 3D shape of the physical object to be able to run the decryption or hashing algorithm backwards.

In a further embodiment, source information that may represent the original source and/or the current source (e.g., an intermediate distributor) may be included in a document that is created w % ben the dental material or dental restoration is transferred from one party to another. This transfer document may be placed into a block chain that proves the transfer has occurred. This block chain entry can be processed with many other similar transfer documents so that the block chain entry cannot be changed after each transfer occurs. These blockchain entries can be used to verify a chain of title for dental material.

Figure 7:
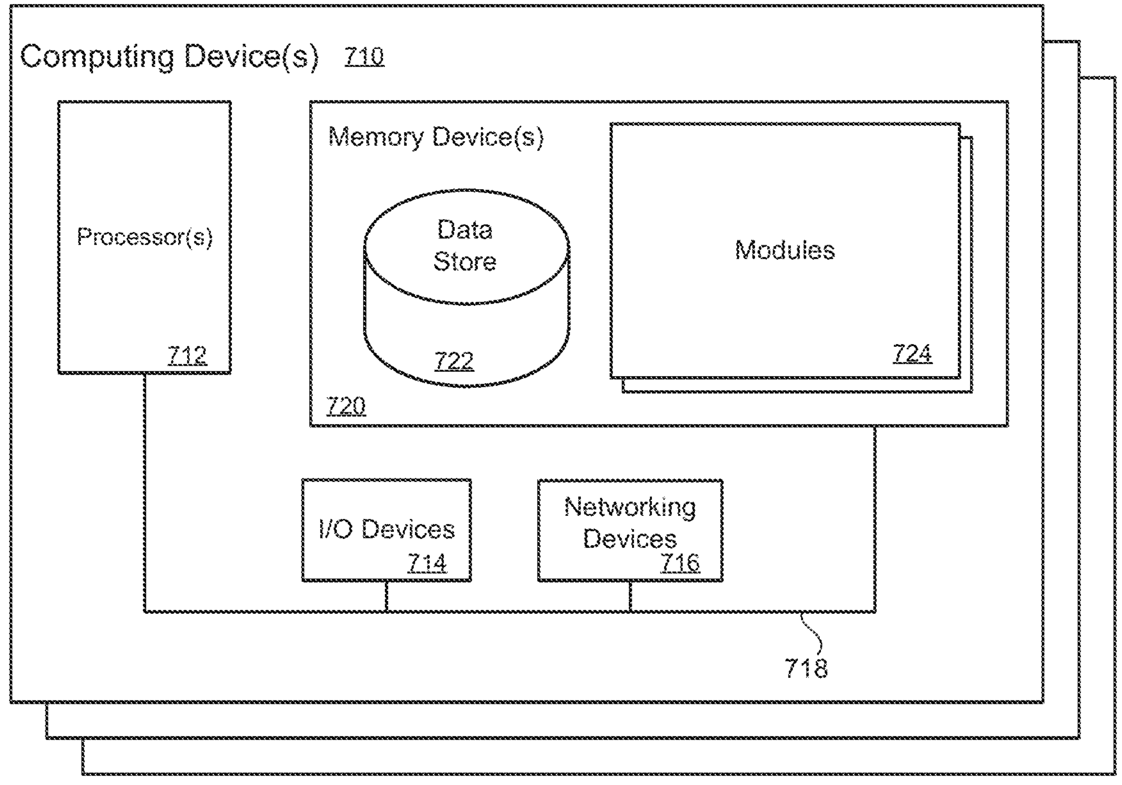
FIG. 7 is a block diagram that provides an example illustration of a computing device that can be employed in the present technology.

FIG. 7 illustrates a computing device 710 which may execute the foregoing subsystems of this technology. The computing device 710 and the components of the computing device 710 described herein may correspond to the servers and/or client devices described above. The computing device 710 is illustrated on which a high-level example of the technology may be executed. The computing device 710 may include one or more processors 712 that are in communication with memory devices 720. The computing device may include a local communication interface 718 for the components in the computing device. For example, the local communication interface may be a local data bus and/or any related address or control busses as may be desired.

The memory device 720 may contain modules 724 that are executable by the processor(s) 712 and data for the modules 724. For example, the memory device 720 may include an inflight interactive system module, an offerings subsystem module, a passenger profile subsystem module, and other modules. The modules 724 may execute the functions described earlier. A data store 722 may also be located in the memory device 720 for storing data related to the modules 724 and other applications along with an operating system that is executable by the processor(s) 712.

Other applications may also be stored in the memory device 720 and may be executable by the processor(s) 712. Components or modules discussed in this description that may be implemented in the form of software using high programming level languages that are compiled, interpreted or executed using a hybrid of the methods.

The computing device may also have access to I/O (input/output) devices 714 that are usable by the computing devices. An example of an I/O device is a display screen that is available to display output from the computing devices. Other known I/O device may be used with the computing device as desired. Networking devices 716 and similar communication devices may be included in the computing device. The networking devices 716 may be wired or wireless networking devices that connect to the internet, a LAN, WAN, or other computing network.

The components or modules that are shown as being stored in the memory device 720 may be executed by the processor 712. The term "executable" may mean a program file that is in a form that may be executed by a processor 712. For example, a program in a higher-level language may be compiled into machine code in a format that may be loaded into a random-access portion of the memory device 720 and executed by the processor 712, or source code may be loaded by another executable program and interpreted to generate instructions in a random-access portion of the memory to be executed by a processor. The executable program may be stored in any portion or component of the memory device 720. For example, the memory device 720 may be random access memory (RAM), read only memory (ROM), flash memory, a solid-state drive, memory card, a hard drive, optical disk, floppy disk, magnetic tape, or any other memory components.

The processor 712 may represent multiple processors and the memory 720 may represent multiple memory units that operate in parallel to the processing circuits. This may provide parallel processing channels for the processes and data in the system. The local interface 718 may be used as a network to facilitate communication between any of the multiple processors and multiple memories. The local interface 718 may use additional systems designed for coordinating communication such as load balancing, bulk data transfer, and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here can also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which can be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology can be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements can be devised without departing from the spirit and scope of the described technology.

What is claimed is:

1. A certification system for tracking bulk dental material as the bulk dental material becomes a dental restoration, the system comprising:

a) a bulk dental material comprising a disc, block or blank and configured to subsequently originate multiple different dental restorations;

b) a machine-readable trackable code directly on the disc, block or blank or packaging associated with the disc, block or blank, the machine-readable trackable code associated with bulk information of the bulk dental material, the bulk dental material comprising at least one of: a manufacturer name, a product name, a model number, a batch number, a serial number, a reference number, or a material composition of the bulk dental material; the machine-readable trackable code containing the bulk information of the bulk dental material encoded within the trackable code itself or being associated with the bulk information of the bulk dental material stored in a database; the machine readable trackable code comprising at least one of: a barcode, a quick-response (QR) code, a radio frequency identification (RFID) tag, or a near-field communication (NFC) device;

c) a plurality of certificates associated with and carried with the bulk dental material, each certificate having a different machine-readable distinguishable code associable with restoration information of a different one of the multiple different dental restorations, each machine-readable distinguishable code comprising a unique restoration serial number configured to be unique to an associated dental restoration, each certificate configured to be associable with a different one of the multiple different dental restorations, each certificate comprising a monolithic sheet with a partition breakable to separate into two parts including a dentist part distributable to a dentist and a patient part distributable to a patient, each part having the machine-readable trackable code and the machine-readable distinguishable code, the machine-readable distinguishable code comprising at least one of: a barcode, a quick-response (QR) code, a radio frequency identification (RFID) tag, or a near-field communication (NFC) device; and d) a computing device comprising one or more processors coupled to memory and configured to:

receive the bulk information of the bulk dental material associated with the machine-readable trackable code;

receive restoration information associated with the machine-readable distinguishable code of the multiple different dental restorations; and retrieve, in response to scanning the machine-readable trackable code or the machine-readable distinguishable code, the bulk information of the bulk dental material or the restoration information of a respective one of the multiple different dental restorations.

2. The system in accordance with claim 1, wherein the machine-readable trackable code comprising at least one of: hashed information from a reversible hashing function, or encrypted information encrypted with a private key and decryptable with a public key.

3. The system in accordance with claim 1, wherein the bulk dental material further comprises:

zirconia comprising zirconium oxide (ZrO2) and at least one other oxide summing to between 6.5 weight % (wt %) to 20 wt % based on a total weight percent of the zirconia.

4. The system in accordance with claim 1, wherein each certificate further comprises:

a zirconia classification mark representing a mol % of zirconia in the bulk dental material.

5. The system in accordance with claim 1, wherein the one or more processors are further configured to:

receive laboratory information associated with a dental laboratory's fabrication of a dental restoration, the laboratory information comprises at least one of: a dental laboratory name, a restoration type, a date restoration was delivered to a dentist, a prescribing dentist's name, or a serial number of the restoration.

* * * * *